July 7, 1931.  C. DAVIS  1,813,281
FACE POWDER BOX
Filed March 28, 1930   3 Sheets-Sheet 1
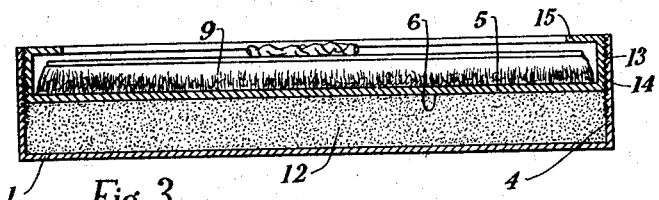
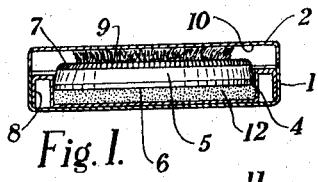
Fig. 1.
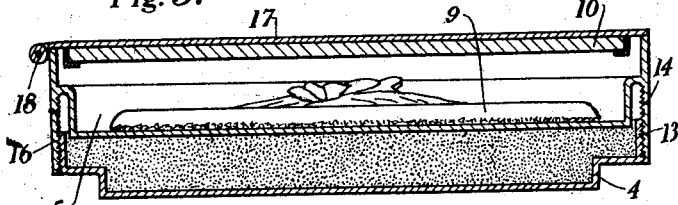
Fig. 3.
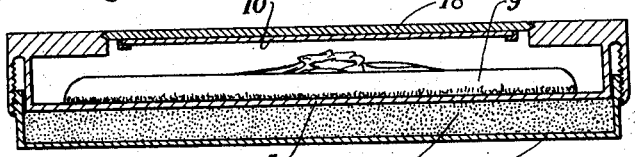
Fig. 4.
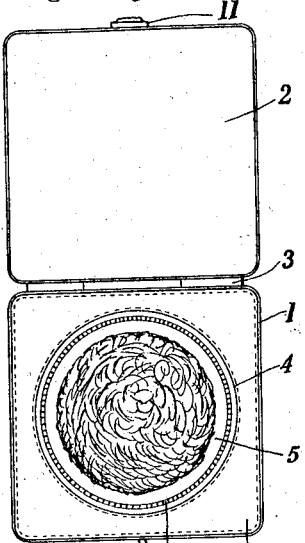
Fig. 2.
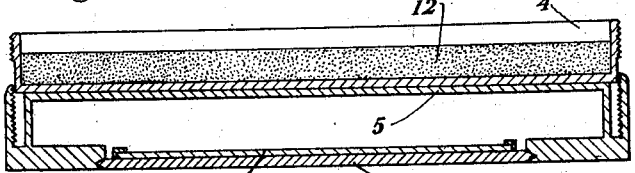
Fig. 5.
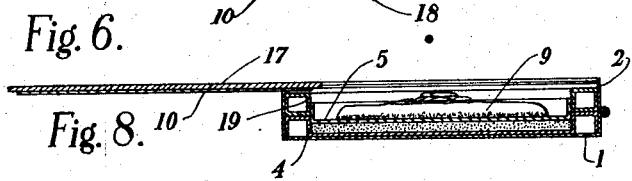
Fig. 6.
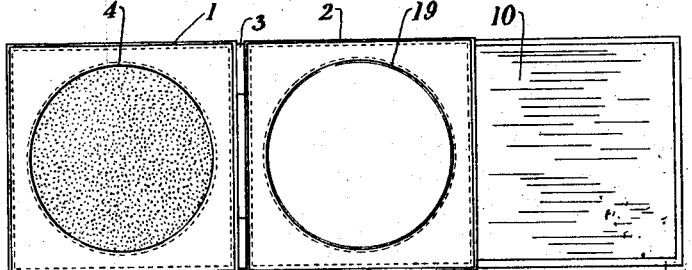
Fig. 8.
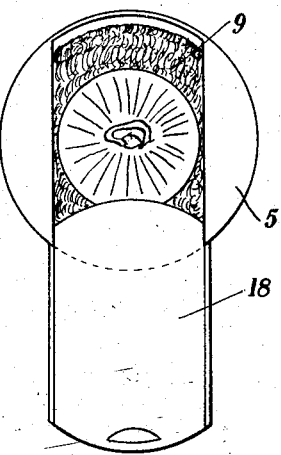
Fig. 7.
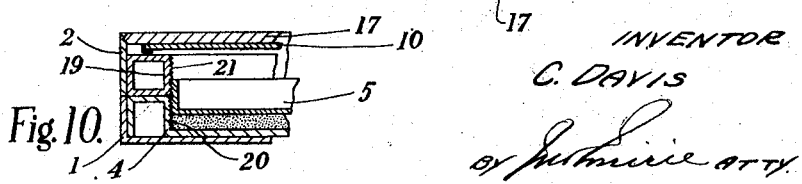
Fig. 9.   Fig. 10.
INVENTOR
C. DAVIS July 7, 1931.  C. DAVIS  1,813,281
FACE POWDER BOX
Filed March 28, 1930   3 Sheets-Sheet 2
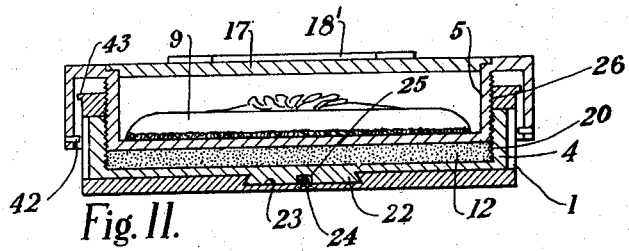
Fig. 11.
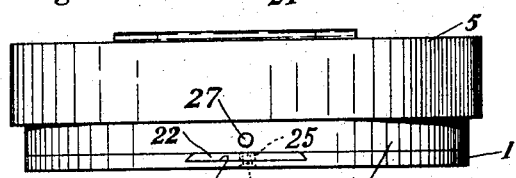
Fig. 12.
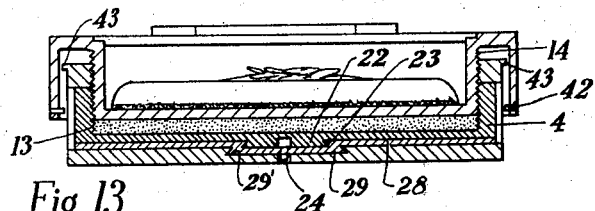
Fig. 13.
Fig. 16.
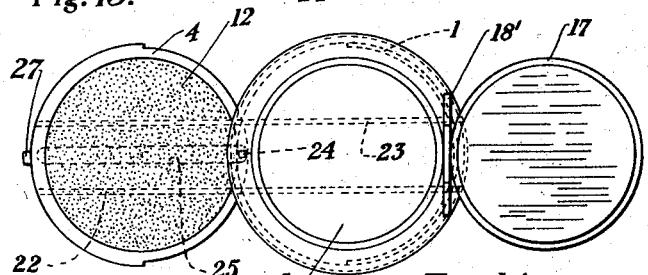
Fig. 14.
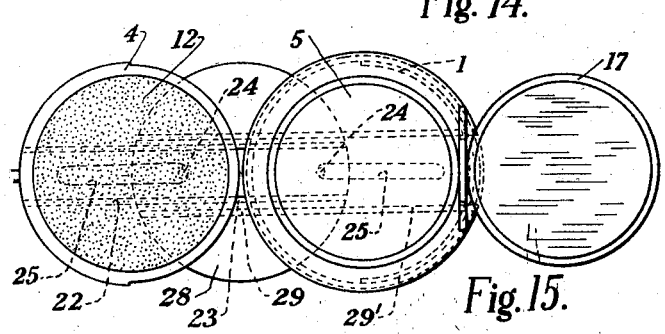
Fig. 15.
Fig. 25.
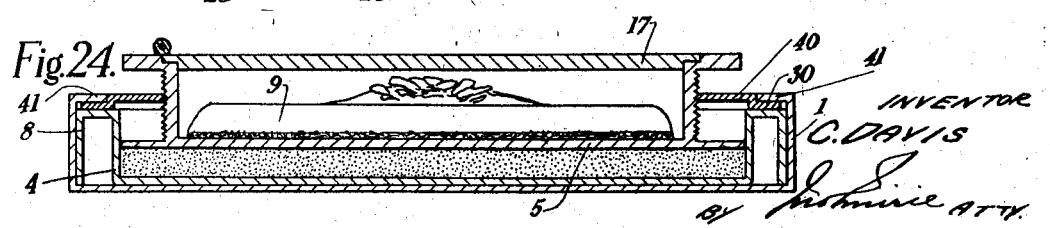
Fig. 24.
INVENTOR
C. DAVIS

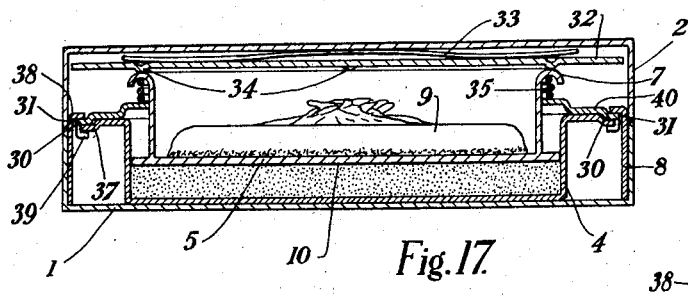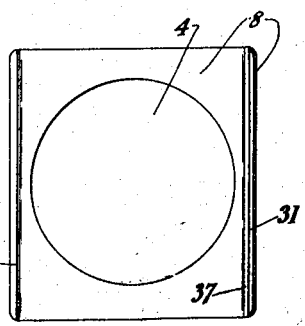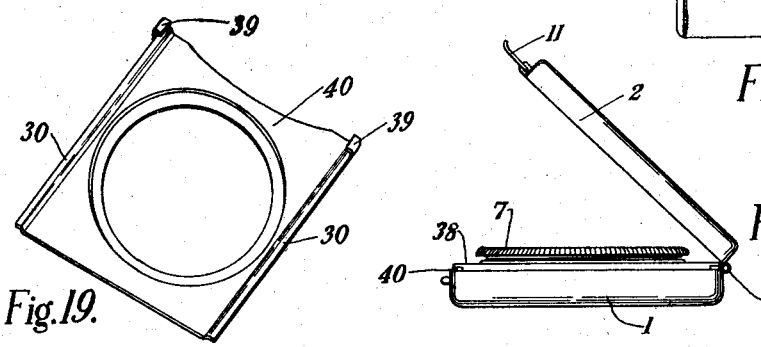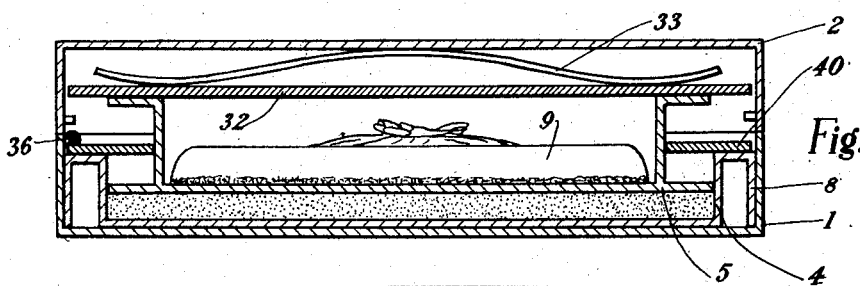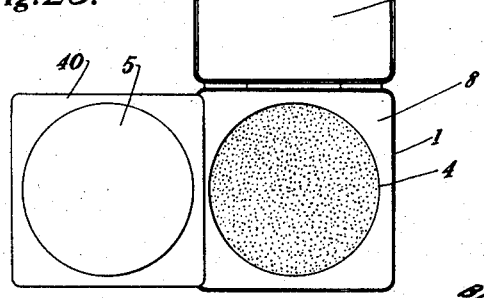

Patented July 7, 1931

1,813,281

UNITED STATES PATENT OFFICE

CHARLES DAVIS, OF NEUILLY-SUR-SEINE, FRANCE

FACE POWDER BOX

Application filed March 28, 1930, Serial No. 439,742, and in France April 9, 1929.

Face-powder boxes hitherto have been filled either with loose-powder or with so-called "powder compact", which is a hard brittle conglomerate of compressed powder and a binder.

Powder is preferred to a hard compact, from a hygienic point of view, as it does not contain binders which are injurious to the skin. Powder boxes can be easily refilled with powder by the user. Powder, however, is apt to be spilt when the powder box is shaken and used and is untidy. Moreover, the puff is apt to be overloaded unless sifters are provided in the box. A hard powder compact being brittle is easily broken by rough use of the pad and by dropping of the box, and is expensive to renew.

The object of the invention is to enable the advantages of both the powder and the hard compact to be obtained without the disadvantages of either.

This object is attained by the invention which is characterized by the provision of a compartment or container for loose powder (which container can be refilled easily, economically and as required by the user) and a device operable manually by the user for compressing the loose powder into a soft but firm compact which surprisingly retains its compact condition, even when the box is opened to expose it and is shaken in the hand. It is a mean between the loose powder and the hard brittle compact.

In order to ensure a soft, but firm powder compact, the compressor must have a relatively hard and smooth compressing surface, preferably adapted to be rotated while firmly pressed onto the powder. This surface need not be flat, for example, it may be ribbed concentrically so that the surface of the soft but firm compact is undulated to facilitate removal of powder by the puff.

The box and the compressor may take many forms.

The compressor may be screw-threaded so that when rotated, the screw not only effects compression of the powder but may be utilized to lock two parts of the casing of the box together, at the same time moreover ensuring that the powder compact is maintained in a compressed condition while the box is closed (even if the box be dropped) and also ensuring that the powder must be compressed each time the box is closed.

The compressor need not be screw-threaded, but may be freely mounted so that it can be merely rotated and pressed onto the powder. In such an example, when the box is closed, the compressor may be held pressed onto the powder compact by a spring or other resilient medium with or without an intermediate pressure plate between it and the lid of the box; for example, even the resiliency of the puff may be utilized for this purpose.

In any form, when the box is closed, the puff should be carried in a compartment separate from the powder in order to avoid overloading of the puff with powder and disturbance of the soft but firm powder compact. The compressor is preferably made hollow to contain the puff for this reason and to economize space.

As it is sometimes desirable by the user that she shall be able to hold the puff in one hand and to hold the box in the other hand in an open condition with the powder compact and a mirror exposed, the parts are preferably connected so as to admit of this, for example, the compressor may be carried by one part of the casing which is hinged to the other which contains the powder-compact, or the powder compact may be in a sliding drawer, or, further, the compressor may be mounted in a frame hinged or sliding relatively to the container for the powder compact.

Such examples are hereinafter described with reference to the accompanying drawings, in which similar reference numerals indicate corresponding parts throughout the different figures.

In these drawings:

Figure 1 is a cross-section of one form of powder-box according to the invention, and Figure 2 is a plan of the same opened out.

Figures 3 and 4 are cross-sections of two other forms on an enlarged scale.

Figure 5 is a cross-section of a fourth form on an enlarged scale, the box being closed, Figure 6 being a cross-section on an enlarged scale with the parts in position ready for use.

Figure 7 is a plan of the box shown in Figure 5, but with the sliding lid open.

Figure 8 is a cross-section of a fifth form partly closed, a sliding lid being opened to permit of extraction of the puff, Figure 9 being a plan of this form fully opened out ready for use.

Figure 10 is a section on a larger scale, of part of the fifth form in the totally closed condition.

Figures 11 and 12 are respectively, a cross-section and a front view of a sixth form on an enlarged scale, Figure 13 being a cross-section of a seventh form or slight modification thereof.

Figure 14 is a plan of the sixth form,

Figure 15 being a plan of the seventh form or slight modification thereof.

Figure 16 is a plan of an eighth form fully opened out ready for use,

Figure 17 being a cross-section on a larger scale of this form, but in the fully closed condition.

Figure 18 is a side elevation of this form partially opened.

Figure 19 is a perspective view of a detail.

Figure 20 is a plan of a detail, part being broken away.

Figure 21 is a side elevation of this form fully opened.

Figures 22 and 23 are a sectional elevation and a plan respectively, of a ninth form in the closed and fully opened positions, respectively.

Figure 24 is a sectional elevation of a tenth form in the closed position.

Figure 25 is a view of a modified form of compressing surface.

The casing of the powder-box illustrated by Figures 1 and 2 comprises two parts 1 and 2 hinged together at 3. 4 indicates a compartment or container for powder. As the parts 1 and 2 are substantially square or rectangular, the container 4 is cylindrical to receive a circular rotary compressor 5, which has a hard smooth compressing surface 6, and a milled edge 7 to facilitate manual rotation by the user. The cylindrical container 4 is formed with an extension 8 to fit the square part 1, but it may be otherwise formed.

The compressor 5 also carries a puff 9. The inner face 10 of the part 2 may form a mirror.

When the container 4 is first to be filled, or is to be refilled with powder, the part 2 is raised about its hinges and the compressor 5 is removed. When the container 4 has been filled with powder the compressor 5 is replaced and firmly pressed and rotated so as to compress the powder into a soft but firm compact, and if this is not immediately required for use, the part 2 is closed down onto the part 1 and secured by a suitable fastener 11, thereby firmly pressing the resilient puff 9 and, therefore, forcing the hard smooth surface 6 of the compressor 5 onto the soft but firm powder compact 12, which is thereby maintained against disturbance or disintegration even if the powder-box be shaken or be dropped.

As the puff 9 is held in the part 2 separate from the powder-compact 12 when the powder-box is closed, it is not liable to be overloaded with powder or to disturb the surface of the compact 12.

The form of powder-box illustrated by Figure 3 simply comprises a single cylindrical casing 1, the lower interior portion 4 of which forms the powder container while the upper interior is screw-threaded at 13 to receive the screw-threaded part 14 of a rotary compressor 5 having a hard smooth compressor surface 6. The compressor 5 is hollow and provided with a retaining rim 15 for holding a loose puff 9, separate from the soft but firm powder compact 12. In this form of powder-box, the powder is compressed by rotating the screw-threaded compressor 5 in one direction, rotation in the other permitting its removal to expose the compact 12 ready for use.

In the form of powder-box illustrated by Figure 4, the cylindrical hollow compressor 5 containing the loose puff 9 has an outer cylindrical sleeve 16 to be gripped by one hand, so that it can be rotated relatively to the container 4, which is gripped in the other hand.

The container 4 and the compressor 5 are screw-threaded at 13 and 14 respectively. The compressor 5 has a lid 17 hinged at 18 to permit of access to the puff 9. The lid 17 has a mirror 10 on its inner face.

The form of powder-box illustrated by Figures 5, 6 and 7 is similar to that last described, but the compressor 5 is provided with a sliding lid 18 fitted with a mirror 10. When the powder compact 12 has been formed in the container 4, the compressor 5 is inverted as shown in Figure 6 to receive the container 4, so that the user can hold the powder-box in one hand and the puff in the other.

The casing of the form of powder-box illustrated by Figures 8, 9 and 10 comprises two parts 1 and 2, which are hinged together at 3. These parts, like the form shown in Figures 1 and 2, are of substantially square or rectangular shape and the part 1 is fitted with a cylindrical container 4. The part 2 is also fitted with a cylindrical member 19. The container 4 and member 19 are internally screw-threaded at 20, 21, respectively, for the reception of a screw-threaded compressor 5 which is hollow to contain a puff 9. The part 2 of the casing has a sliding lid 17 provided with a mirror 10. When the compressor 5 has compressed the powder in the container 4 into a soft and firm compact and remains in the position indicated in Figure 8, it locks the two parts 1 and 2 of the casing together in addition to maintaining the powder compact against disturbance or disaggregation, as in the previous forms described.

In the form of the powder-box illustrated by Figures 11, 12 and 14, the powder container 4 constitutes a drawer sliding in and out of a casing 1, which is open at its front to permit of this. The container 4 has a dovetailed projection 22 sliding in a corresponding groove 23 in the bottom of the casing 1. A stop pin 24 on the casing engages in a slot 25 in the bottom of the drawer to limit the outward movement of the container 4.

The container 4 and the casing 1 are screw-threaded internally at 20 and 26, to receive the screw-threaded compressor 5, when the drawer or container 4 is in the casing, to allow of compression of the powder into a soft but firm compact 12 and to lock the drawer or container 4 in its closed condition.

When the powder compact 12 is to be used, the compressor 5 is unscrewed to free the drawer or container 4 which is drawn out by a knob 27. A lid 17 hinged at 18' to the compressor 5 is opened to enable the puff 9 to be taken out of the hollow compressor 5 and the parts are in the positions indicated in Figure 14.

Stops 42 on the compressor are provided to co-operate with stops 43 on the case 1 to prevent the complete removal of the compressor.

In order to allow the drawer or container 4 to be withdrawn completely from the casing 1 as indicated in Figure 15 and yet be supported, an intermediate sliding plate 28 is provided having a dovetailed projection 29 sliding in a corresponding groove 29' in the bottom of the casing 1 and having a dovetailed grove 23 to receive the dovetailed projection 22 on the drawer or container 4.

Stop pins 24 on both faces of the plate 28 slide in slots 25 in the casing 1 and the drawer or container 4 to limit the outward sliding movements of the plate 28 on the container 4 and of the drawer or container 4 on the plate 28.

In the form of powder-box illustrated by Figures 16 to 21, the casing comprises two parts 1 and 2 of substantially square or rectangular shape, hinged together at 3. The part 1 is fitted with a cylindrical powder container 4 having an extension 8 to fit the part 1 of the casing. A cylindrical compressor 5, which is hollow to contain a loose puff 9 is freely mounted in a frame 40 which slides on the top of the extension 8 and also has its side edges 30 bent so that they penetrate and slide in slots 31 formed in the extension 8. The bent edges 30 conform in shape to depressed portions 37 and penetrate under raised or pressed up portions 38 of said extension 8. By these means the frame 40 is guided as it slides in and out relatively to the casing 1. It has lugs 39, Figure 19, which limit its outward movement so that its smooth hard face 10 still overlaps the top of the adjacent extension 8 of the container. This obviates the necessity for raising the compressor before the frame 40 is pushed back.

The compressor 5 has a milled edge 7 to facilitate manual rotation by the user. The part 2 of the casing has a loose pressure plate 32 secured to it by a leaf spring 33. The outer face of this pressure plate 32 may be polished to form a mirror and it is, therefore, provided with projections 34 for contact with the edge 7 of the compressor when the box is closed.

When the powder-box is to be first filled or to be refilled with powder, the part 2 of the casing is opened and the compressor 5 is raised in the frame 40, either by hand or by a light spring 35 provided for this purpose, the spring 35 being weaker than the spring 33. The compressor 5 then, together with the frame 40, is slidden out of the casing 1 into the position indicated in Figures 16 and 21. The powder is inserted in the container 4. The frame 40 and compressor 5 are then returned so that the compressor 5 is over the container 4. This can be effected by merely pushing in the sliding frame 40, which will bring the compressor 5 over the powder and if the spring 35 be omitted the compressor 5 will fall onto the powder automatically.

The sliding frame 40 can, however, be returned by holding the compressor 5 and pushing or drawing it together with the slide until the compressor 5 is over the powder when the compressor is released. It is then rotated and pressed firmly onto the powder to compress it into a soft but firm compact. The part 2 of the casing is then closed and fastened by a suitable fastener 11. The spring 33 then forces the plate 32 onto the compressor 5 and the latter onto the powder compact, which is maintained against disturbance or disintegration, even if the powder box be shaken or dropped.

When the powder compact is to be used, the user opens out the parts as indicated in Figures 16 and 21, holding the powder box in one hand and the puff in the other.

The form of power-box illustrated in Figures 22 and 23 is very similar to that just described. It differs in that the compressor 5 is carried in a frame 40, which is hinged at 36 to the part 1 of the casing, so that when the part 2 of the casing is raised or opened, the frame 40 with the compressor 5 can be swung about the hinges 36, to expose the container 4 and the powder compact therein.

The form of powder-box illustrated by Figure 24 is similar to that described above with reference to Figures 16 to 21.

The edges 30 of the slide 40 are guided between the surface of the extension 8 and the inturned edges 41 of the sides of the case 1. The compressor 5 is screw-threaded for engagement in the slide 40 and is provided with a hinged lid 17 to allow access to the puff 9 in the hollow compressor.

Although a plain, smooth, hard compressing surface is preferred for the compressor, in any of the forms hereinbefore described, it may be ribbed concentrically as indicated in Figure 25, so that a smooth, but undulated upper surface is imparted to the soft but firm powder-compact to facilitate removal of powder by the puff.

I claim:

1. A face-powder box comprising a container for powder, a rotary compressor for compressing the powder in said container into a soft but firm compact, a lid for the box and resilient means between said lid and said compressor for maintaining said compressor in firm contact with the powder compact in said container when the lid is closed.

2. A face-powder box comprising a container for powder, a rotary compressor for compressing the powder in said container into a soft but firm compact, and means for supporting said rotary compressor in operative position over the powder in said container, said container and said supporting means being relatively displaceable to permit of the exposure of the soft but firm powder compact when required for use.

3. A face-powder box comprising a container for powder, a rotary compressor, a frame for carrying said compressor, said frame being movable relatively to said container for the purpose of carrying said compressing member into an operative position on said container and away therefrom to expose said container and the powder compact therein.

4. A face-powder box comprising a container for powder, a rotary compressor, a frame for carrying said compressor, said frame being adapted to slide on said container for the purpose of carrying said compressing member into an operative position on said container and away therefrom to expose said container and the powder compact produced therein.

5. A face-powder box comprising a container for powder, a frame adapted to slide on said container and means for guiding said frame on said container during its sliding movements, and a rotary compressor carried by said frame for compressing powder in said container into a soft but firm compact, said compressor being hollow to form a compartment for the reception of a puff separate from the powder in said container.

6. A face-powder box comprising a casing composed of two parts hinged together, a container for powder situated in one part of said casing, a frame adapted to slide in and out of said part of the casing, a rotary compressor carried by said frame for compressing powder in said container into a soft but firm compact, and a pressing plate and a spring situated in the other part of said casing for pressing said compressor into firm contact with the powder compact in said container when the frame and compressor are in the operative position and said two parts of said casing are closed together.

In testimony whereof I have signed my name to this specification.

CHARLES DAVIS.